United States Patent [19]

Sweeney et al.

[11] 3,790,106
[45] Feb. 5, 1974

[54] FLAP SYSTEM

[76] Inventors: Thomas E. Sweeney, 95 Hartley Ave., Princeton, N.J. 08540; William S. Schweizer, 58 Larchmont Rd., Elmira, N.Y. 14905; James J. Morris, 108 Meadow Brook Ln., Brookhaven, Pa. 19015

[22] Filed: Jan. 24, 1973

[21] Appl. No.: 326,393

[52] U.S. Cl. .......................... 244/42 CB, 244/76 C
[51] Int. Cl. ............................................ B64c 3/38
[58] Field of Search .. 244/40 R, 41, 42 DA, 42 DB, 244/42 DC, 42 CH, 75 R, 75 A, 76 R, 76 A, 76 B, 76 C, 77 SE, 77 F, 77 G, 77 V, 77 R

[56] References Cited
UNITED STATES PATENTS

| 2,655,326 | 10/1953 | Weick | 244/42 A |
| 2,734,704 | 2/1956 | Vogt | 244/76 R |
| 2,742,245 | 4/1956 | Harpoothian et al. | 244/42 A |
| 2,908,454 | 10/1959 | De Wolff | 244/42 DB |

Primary Examiner—Duane A. Reger
Assistant Examiner—Jesus D. Sotelo
Attorney, Agent, or Firm—Michael W. York

[57] ABSTRACT

A flap system for improving the lifting capabilities of aircraft wings and for alleviating the effects of wind gusts acting upon aircraft including flaps pivotally mounted near the trailing edges of the aircraft's wings, which each have a separate and distinctive leading edge portion and a trailing portion which are pivotally connected. Locking apparatus are provided which can be actuated to lock the leading edge portion and the trailing edge portion of each flap together, and to maintain the leading edge portion of each flap in a stationary position relative to the wing when the trailing flap portion is disengaged from the leading edge flap portion. When the leading edge flap portion and the trailing edge flap portion are locked together, the flap serves as a high lift flap and when the leading edge flap portion is held in a stationary position with respect to the wing and the trailing edge flap portion is disengaged from the leading edge flap portion, the trailing edge flap portion is freely floating and acts as a gust alleviation flap.

10 Claims, 4 Drawing Figures

PATENTED FEB 5 1974  3,790,106
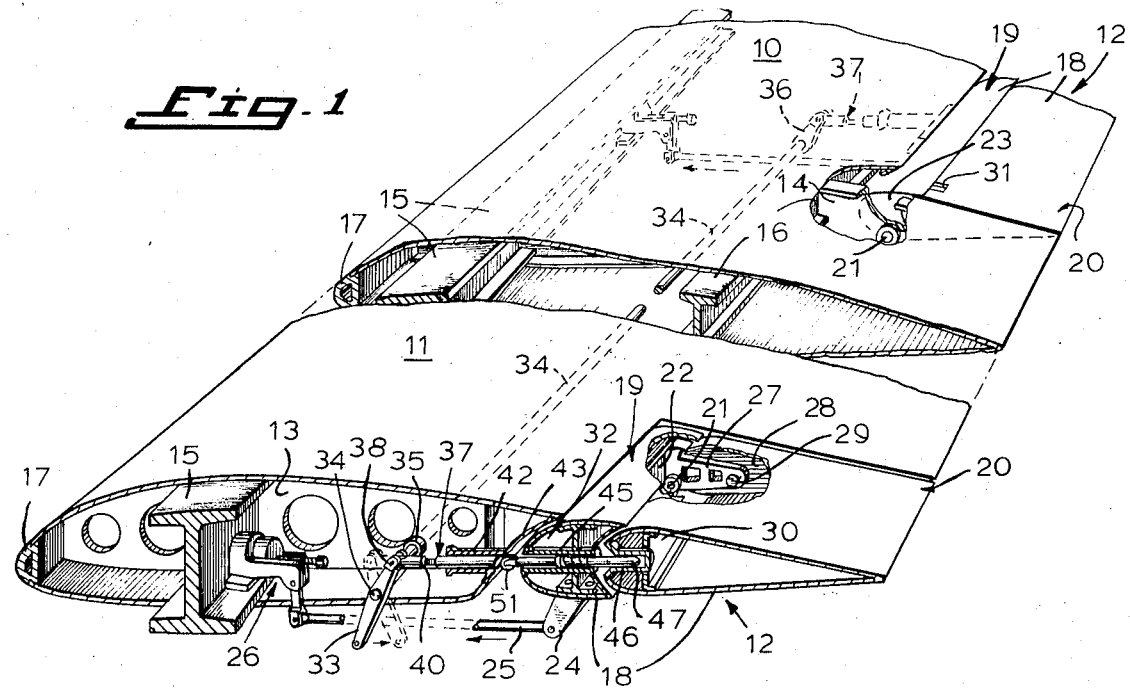
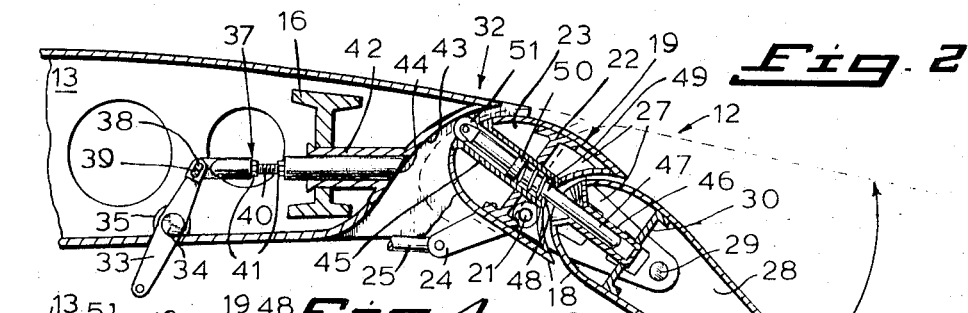
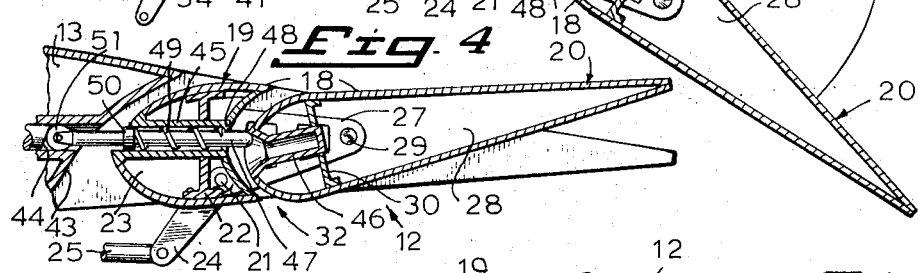
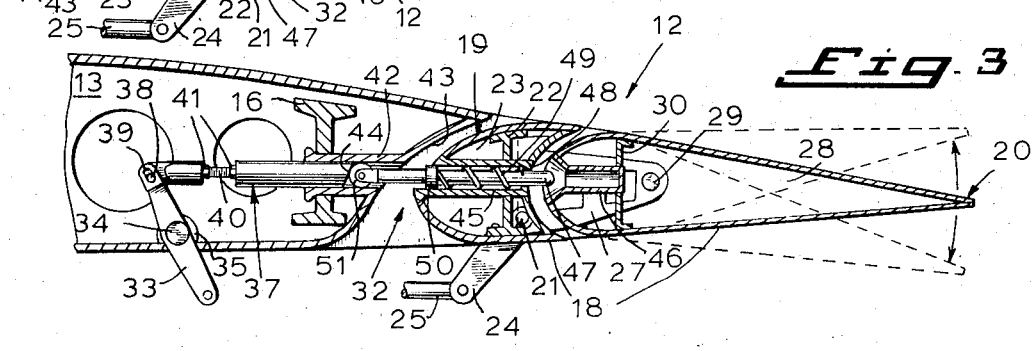

FLAP SYSTEM

BACKGROUND OF THE INVENTION

Various devices that are operable to enhance the lifting capabilities of an aircraft have been known and used for some time. These have taken many forms having varying degrees of complexity and sophistication, but perhaps one of the most commonly used and most effective lift generating device is use on aircraft today is the trailing edge wing flap, which in one form or another, can be found on virtually all high performance modern day aircraft. Trailing edge flaps have been developed, refined and used on aircraft for a considerable time and there is no doubt or question as to their outstanding contribution to aircraft performance, primarily during take-off and landing maneuvers. It is during these portions of flight that the ability to achieve a high lift coefficient for the wing is most important in order that rapid take-offs and slower landing speeds can be achieved, thereby contributing greatly to the safe and efficient operation of the aircraft.

Typical of some of the varied prior art trailing edge flap configurations are those which are shown and described in U.S. Pat. Nos. 2,416,958; 2,908,454 and 3,162,402. The flap disclosed in U.S. Pat. No. 2,416,958 is somewhat distinguished from the others in that it has application to "all wing" or tailless aircraft. In accordance with the teachings of this patent, a floating flap is located in a rearward position with respect to the aircraft center of gravity and makes use of a geared tab acting in consonant with the flap to produce high lift coefficients of the wing, with a minimal effect on the pitch and moment characteristics, and therefore the controllability that is peculiar to this type of all wing or tailless aircraft.

U.S. Pat. No. 2,908,454 discloses a flap system having an auxiliary flap disposed behind a main flap with appropriate linkages arranged between them, so that the main and auxiliary flap will be capable of movement in a prescribed arcuate manner to assure the proper disposition of the flaps in accordance with specific settings for varying phases of flight.

U.S. Pat. No. 3,162,402 discloses a high lift flap rotating cylinder device that is particularly suited for use in connection with vertical and steep take-off and landing aircraft. In this arrangement, the flap has several distinctive segments or portions, including a trailing auxiliary flap portion, and in addition an operating linkage is provided to move the trailing auxiliary flap portion in a prescribed manner.

Notwithstanding the advances, refinements and general acceptance and use of lift generating flaps, attempts to cope with the effect of wind gusts have not been as fruitful or dramatically successful, although the desire to reduce the effect of turbulent air on an airplane in flight is, most certainly, not recent in origin. As a matter of fact, gust alleviation devices of one type or another are quite old in aeronautical history - each intended, by one means or another, to alleviate the adverse effects of gusts upon the aircraft and its occupants.

The motivations for the attention given to this problem are obvious to those who, at some discomfort, have flown through extreme turbulence, but perhaps are even more obvious to pilots of military aircraft such as low level bombers or ground support aircraft. In these aircraft elimination of rolling and pitching moments caused by wind gusts is most essential to enable the accurate delivery of ordnance to the target or to provide a stable reconnaissance platform. Notwithstanding the importance of these requirements, the airplane designer is, however, most aware of the weight and performance penalty his airplane suffers because of the necessity to design for structural integrity during high speed flight in extreme turbulence.

The problems caused by gusts acting upon aircraft have been receiving attention for some time and typical of some of the prior art gust alleviation systems which have been developed are those shown and described in U.S. Pat. Nos. 2,655,326 and 2,745,613. U.S. Pat. No. 2,655,326 discloses a power actuated gust alleviating surface or flap situated at the trailing edge of a wing which relies upon the disposition of a mass, located within the wing and movable by gust caused acceleration forces, to actuate the flap at the trailing edge of the wing so that it will tend to aerodynamically counteract the effect of the wind gust on the wing. In the arrangement shown and described in U.S. Pat. No. 2,745,613, structural deformation of an aircraft wing caused by gust forces is sensed and utilized to actuate an aerodynamic surface which is introduced into the airstream and acts to compensate for and counteract the effect of the gust load.

Gust alleviation flap devices can be categorized as either active or passive in their function and the most attention has been given to active systems. Since the effect of a vertical gust is to produce, to some degree, an abrupt angle of attack change of the aircraft, almost all active systems incorporate an angle of attack sensor. The sensor output, in effect, provides a signal to a servo system in most cases, which in turn operates a lift changing device — usually the aircraft's flaps. There are many clever variations on this theme and while some of the better systems can be quite effective they generally all suffer from some degree of mechanical complication which involves weight or cost and their attendant disadvantages. An additional and quite fundamental defect associated with active systems is the fact that generally only one angle of attack sensor is employed. Such a sensor does not sense the angle of attack change over the entire span but, rather, only senses a discrete value for a particular location. Since gusts are not necessarily uniform over the entire wing span, this defect is significant. The importance of this defect can be most easily judged by pilots who have, in turbulent air near the ground, experienced strong rolling moments due to vertical gust.

The passive systems are fundamentally different in their approach to the problem and it is in this direction that the most significant results can be obtained. Passive systems can be generally categorized as utilizing either structural deformation of the wings or floating lifting surfaces to alleviate the effect of gusts. Wing deformation to alleviate the effect of gusts have been developed to a high degree of perfection, considering its limitations, by superb aero-elastic design of the wing, particularly on high subsonic speed swept wing transport type aircraft. This type of gust alleviation is, in this sense, a current and accepted art.

While experimentation with floating lifting surfaces has indicated a potential for far greater effectiveness in alleviating the effects of wind gusts on aircraft, this type of a system has not, until the present invention, been completely introduced into the art of aeronautics. The floating wing is one such device which could be suitable for this purpose, however, it suffers from practical considerations which prevent its general adaptation to aircraft. It is, in essence, a wing pivoted so as to change its angle of incidence with little change in angle of attack when encountering vertical gusts. Some known arrangements have made use of geared tabs to produce the desired wing pitching moments about the hinge point and others have not. This is largely dependent upon the chordwise location of the pivot point. While theoretically this device is capable of extremely effective gust alleviation, its application to airplanes does not appear at all practical. Aside from flutter problems which have been encountered during the course of experimentation, there are more severe limitations associated with the practical application of such a system. These revolve for the most part around the greatly increased moment of inertia acting about the pivot point when the wing is used as a support for engines, external stores and fuel tanks. These considerations, together with the necessity for heavy root bearings to support the tremendous loads and stresses and provide a reasonable safety margin greatly reduce the attractiveness of such a system.

It is evident from the prior art and the direction of previous development attempts that attempts to cope with the gust alleviation problem have relied upon separate and distinct mechanisms or the inherent resiliency of the wing and associated structures to achieve some measure of success. As a consequence, the previously discussed disadvantages have prevented the practical and widespread application of such gust alleviation systems. In this connection, the added weight and complexity of prior art systems which rely upon sensing, actuation mechanisms, controls and aerodynamic surfaces to respond to and compensate for wind gust effects as well as considerations given to the delicate nature and cost of the mechanisms and their proper maintenance have prevented their widespread use. In addition, although high lift and gust alleviation systems have been separately suggested, combined high lift gust alleviation systems have not previously been known. Furthermore, prior art gust alleviation systems have not provided a simple effective gust alleviation flap which forms a part of a high lift flap.

The flap system of this invention overcomes many of the disadvantages associated with previous gust alleviation flap systems, and permits high lift on the wings of an aircraft to be obtained through the use of a high lift flap and gust alleviation to be economically obtained from a portion of the structure which produces the high lift without the need for complex sensing or actuating systems.

SUMMARY OF THE INVENTION

This invention relates to flap systems for aircraft and more particularly to flap systems which utilize flaps for gust alleviation purposes.

It is accordingly an object of the present invention to improve the operation and performance of aircraft by means of a unique gust alleviation flap system which may be readily incorporated into existing or newly constructed aircraft in an economical manner.

It is another object of the present invention to provide a flap system which is capable of functioning in the normal manner to increase the capability of an aircraft's primary lifting surfaces or wings to generate a higher lift coefficient, and alternatively to alleviate the effects of wind gusts acting on the aircraft by reducing vertical accelerations normally caused by gusts.

It is also an object of the present invention to provide a simple and efficient means for selecting and actuating the flap in either the lift generating or gust alleviating mode.

It is yet another object of the present invention to provide an improved flap system which does not impose any appreciable weight penalties on the aircraft and which is capable of functioning in both the lift generating and gust alleviating modes without the need for redundant aerodynamic surfaces.

It is still a further object of the present invention to provide a simple and effective flap system which counteracts the detrimental effects of wind gusts on the structural integrity of the aircraft and thus substantially improves the riding qualities and the operational service life of the aircraft.

It is also an object of the present invention to alleviate the adverse effects of wind gusts acting upon an aircraft during flight without tending to cause any adverse effects on the aircraft's controllability throughout the course of the aircraft's flight envelope.

The present invention provides a flap system for increasing lift and counteracting the effects of gusts on an aircraft which is supported by and operably connected to the trailing edge portion of the wings. Actuating and control means are carried by the wings to adjust the position of the flaps with respect to the wings and separate actuating and control means are provided to select and operate the flaps in either a lift generating or a gust alleviating mode. The flap system of the present invention has flaps with both distinctive leading edge and trailing edge portions and the leading edge portion and the trailing edge portion of each flap are pivotally connected so that the trailing edge portion is capable of movement relative to the leading edge portion. The trailing edge portions have a separate and distinct airfoil shape which is complementary to the shape of the leading edge portions, so that both the leading edge portion and the trailing portion of each flap form a substantially contiguous airfoil which is also complementary to the aircraft wing when the flaps are positioned in a neutral or retracted position. Locking means are associated with the leading and trailing edge flap portions of each flap in order that the two portions can be engaged or disengaged and operated in either the lift generating mode or the gust alleviating mode. In the lift generating mode the respective leading edge flap portions and the trailing flap portions on each wing are locked so that they are capable of movement as a unit relative to the wings under the direction of a flap actuating linkage supported by the wings. In the gust alleviating mode the leading and trailing edge portions are disengaged so that the trailing edge portion is free to pivotally move relative to the leading edge portion while the leading edge portion is maintained in a fixed neutral position relative to the aircraft's wing by the locking means.

BRIEF DESCRIPTION OF THE DRAWINGS

The invention will be hereinafter more fully described with reference to the accompanying drawings in which:

FIG. 1 is a perspective fragmentary view, partly in section, of the wings of an aircraft showing portions of the flap system of the present invention disposed near the trailing edges of the wings;

FIG. 2 is an enlarged side elevational view of a portion of the structure illustrated in FIG. 1 showing one of the flaps of the flap system of the invention in the lift generating mode;

FIG. 3 is an enlarged side elevational view of a portion of the structure illustrated in FIG. 1 showing one of the flaps of the flap system of the invention in the gust alleviating mode with the trailing edge portion of the flap unlocked from the leading edge portion of the flap; and FIG. 4 is a side elevational view of a portion of the structure illustrated in FIG. 3 illustrating the manner in which the extent of unrestrained movement of the trailing edge portion of the flap is limited when the flap system is in the gust alleviating mode.

DETAILED DESCRIPTION OF THE PREFERRED EMBODIMENT

If reference is made to FIG. 1, part of a right wing 10 and part of a left wing 11 of an aircraft are shown with the flap system of the present invention generally designated by the reference number 12, situated near and connected to the trailing edge portion of each wing. The wing structures shown in the drawings are merely representative of one particular structural configuration common to many different types of aircraft. However, the present invention may be utilized in connection with wings having any of a number of other different structural configurations which are well known in the art. Each wing has a plurality of respective long and short airfoil shaped wing ribs 13 and 14 which are spaced apart in a spanwise direction within the wings. These ribs 13 and 14 extend in a chordwise direction and in addition to their structural function they also delineate the airfoil configuration of the wing and the short ribs 13 are located in the wings where the wings have slots for the flap system 12. The wings 10 and 11 are primarily supported from the aircraft fuselage (not shown) by leading and trailing spars 15 and 16, respectively, which generally extend for the full span of each wing through suitable openings that are provided in each of the ribs 13 and 14. The ribs are fastened to the spars and the wing covering, commonly referred to as the skin, in some well known manner, which is not shown in the drawings in the interest of clarity. The forwardmost part of each rib 13 and 14 is shaped to facilitate its connection to a leading edge member 17 which may extend for the entire wing span and define the shape of the wing's leading edge.

As illustrated in FIG. 1, the flap system 12 comprises identical flaps 18 connected to the wings 10 and 11. Since each flap 18 is identical, common reference numerals will be used to denote the identical parts of each flap. Each flap 18 is provided with a distinctive leading edge portion 19 and a trailing edge portion 20. Each leading edge portion 19 is pivotally connected to the adjacent wing 10 or 11 in a conventional manner by a pair of pivot pins, designated by the number 21, two of which are shown, one for each flap. The leading edge portion 19 of each flap 18 is provided with a spar 22 which extends in a spanwise direction and at least one rib 23, one of which is visible in the drawings, situated at each spanwise extremity of the leading edge portion.

A control horn 24 is connected to the lower edge of each spar 22 and a control rod 25 is pivotally connected to the lower end of each control horn. The control horn 24 is adapted to be operated by conventional means such as the actuators and appropriate linkages generally designated by the number 26 to rotate the leading edge portions 19 simultaneously about the pivot pins 21. To give the leading edge portions 19 additional rigidity, additional rib members, which are not shown in the drawings in the interest of clarity, may be situated in the interior of each leading edge portion and be suitably fastened to the spar 22 at spaced intervals.

A pair of brackets 27, one of which is visible in each figure of the drawings, extend aft from each spar 22 and assist in handling added stresses that may be imposed on the flaps 18 as the flaps are actuated and introduced into the airstream by being pivoted about the pins 21. Each bracket 27 extends rearwardly from the leading edge portion 19 a sufficient distance to be received within and provide a pivotal mounting point for the trailing edge portion 20. This pivot point is ideally located at a distance rearward of the leading edge of the trailing edge portion which is approximately equal to 25 percent of the adjacent chord length of the flap trailing edge portion 20, for reasons which will hereinafter be discussed in greater detail. Each trailing edge portion 20 has a rib 28 at each of its ends and each rib 28 is rotatably mounted on a pin 29 which is connected to an adjacent bracket 27 so that each trailing edge portion is pivotally connected to the adjacent leading edge portion 19.

Each trailing edge portion 20 is constructed in a manner similar to the leading edge portion 19 and a spar 30 extends within each trailing portion in a spanwise direction and is fastened in conventional manner to the ribs 28. As illustrated in FIG. 1, apertures, such as the aperture 31, are provided in the skin of each trailing edge portion 20 to provide clearance for the mounting brackets 27 when the trailing edge portions are pivoted about the pins 29.

It should be noted that the leading edge of the trailing edge portion 20 is located in proximity to the concave surface which defines the adjacent trailing edge of the leading edge portion 19, so that the shapes of the adjacent leading edge and trailing edge portions are complementary. Accordingly, when both the leading edge and trailing edge portions 19 and 20 are aligned in their neutral position, as depicted in FIG. 1 they are complementary and will form a substantially contiguous airfoil with a relatively small gap situated between them. As a consequence, and to some extent because of the shape of the gap resulting from the curvatures of the adjoining surfaces on either side of the gap separating the leading edge and trailing portions, detrimental aerodynamic effects caused by the gap between the leading and trailing portions are minimized at low angles of attack of the wing. In some cases, however, and particularly when the wing is at higher angles of attack, the gap may also act as a slot to improve the air flow over the wing in a manner well known to those skilled in the art.

A locking device designated generally by the number 32 is associated with each flap 18 to select the mode of operation of the flap system 12. To actuate the flap system 12 in either the lift generating mode or the gust alleviating mode, the operation of the locking device 32 enables the leading edge portion 19 and trailing edge portion 20 to be engaged or disengaged. Such engagement and disengagement through the locking device 32 is accomplished by the operation of an actuating lever 33 by a suitable control rod (not shown) fastened to one end of the lever and adapted to be operated by the aircraft pilot, an autopilot, or by a remote control signal. The lever 33 is fixedly mounted on a rotatable torque shaft 34 which is suitably supported in bushings 35 provided in the wing ribs 13. The torque shaft 34 permits simultaneous actuation of the locking devices 32 associated with the flaps 18 positioned on each wing 10 and 11 and extends within the wings in a spanwise direction, and is connected at its opposite furthermost extremity to an actuating lever 36, which serves to actuate the locking device associated with the identical flap 18 that is situated on the wing 10. Both levers 33 and 36 are provided with bifurcated upper ends that are adapted to receive one end of each of the respective rods 37 which are associated with each flap and suitably fastened to each rod by pins 38. The pins are adapted to ride in slots such as the slot 39, which are provided in the bifurcated ends of each of the actuating levers as best illustrated in FIGS. 2 and 3.

As best illustrated in FIGS. 2 and 3, a threaded connecting rod 40 forms readily of each of the rods 37, and is secured in position by lock nuts 41. In this manner, provision is made to vary the lengths of the rods 37 which may be adjusted for reasons which will be hereinafter explained in greater detail. When actuated, by rotation of the lever 33, torque shaft 34, and lever 36, the pair of rods 37 connected to each of the respective levers are simultaneously moved within the respective tubular members 42 which are each mounted in alignment with the respective rod and supported by the rear spar 16 of each wing. The tubular member 42 in each wing extends to the trailing surface of the wing recess where it is joined to a cam plate 43. The cam plate 43 may be suitably fashioned from a hard material, such as steel or titanium, to resist wear. In addition, an end of each rod 37 has a surface 44 which is shaped at an appropriate angle so that it too can be generally aligned with and form a continuation of the cam surface when it is positioned as shown in FIGS. 1 and 2.

Each locking device 32 has tubular locking members 45 and 46 which are located respectively within the leading edge portion 19 and trailing edge portion 20 and a locking pin 47 which is reciprocable within the tubular locking members. One end of the tubular member 45 in the leading edge portion 19 of each flap blends into the leading edge skin to which it may be fastened in a conventional manner and is also supported by the spar 22 through which it also passes and to which it may be secured in any suitable fashion. The tubular member 45 is provided at the other end with a lip 48 which serves to guide the pin 47 and as a seat for a compression spring 49 which encircles the pin 47 within the tubular member 45 and bears at its opposite end against a collar 50 that is also fixed in a conventional manner to the pin. The forward end of each pin 47 is provided with a roller 51 which protrudes from the pin into the gap that exists between the leading edge portion 19 and the adjacent trailing surface of the wing recess. This roller 51 serves as a cam follower and is adapted to ride against the aforementioned surface of the cam plate 43 and the end surface 44 of the rod 37 at the trailing edge of the wing recess. The compression spring 49 acting between the lip 48 and the collar 50, urges the locking pin 47 and roller 51 toward the cam surface and assures continuous contact therebetween. The end of the locking pin 47 opposite from the roller equipped end extends into the tubular member 46. The tubular member 46 is supported by the spar 30 of the trailing edge portion 20 and its forward end is flared, fitted and fastened in a conventional manner to the skin at the leading edge of the trailing edge portion.

When the actuating lever 33 is in the full line position as shown in FIGS. 1 and 2, the locking pin 47 is forced rearward and is located within the tubular members 45 and 46 and thus the leading edge portion 19 and trailing edge portion 20 are locked together. Consequently, both portions 19 and 20 form a contiguous airfoil that is capable of moving as a conventional single flap unit, as best seen in FIG. 2 of the drawings, to increase the camber and therefore the lift generating ability of the aircraft's wings 10 and 11. During this phase of operation the cam roller 51 will roll along the relatively smooth concave surface provided by the cam plate 43 and the rod end surface 44 at the trailing edge of the wing flap recess. Although some slight reciprocable movement may be translated by the roller to the pin 47 due to any slight misalignment of the angled rod end surface 44 and the surface of the cam plate, such movement of the pin within the tubular members 45 and 46 will not be sufficient to disengage the pin 47 from the trailing edge portion tubular member 46.

When the actuating lever 33 is moved to the dotted line position illustrated in FIG. 1 (full line position in FIG. 3) each of the rods 37 will be moved forward or to the left as viewed in the drawings. As a consequence, a cavity will be formed in the surface of the cam plate 43 by movement of the rod end surface 44 and the respective rollers 51 situated at the end of each of the pins 47 will be urged by their respective compression springs 49 into the respective cavity. Movement of the pins 47 toward the left causes them to be withdrawn from the respective tubular members 46 in each of the trailing edge portions 20, thereby disconnecting the leading edge portions 19 from the trailing edge portions 20 as illustrated in FIG. 3. It will also be observed in FIG. 3 that the position occupied by the roller 51 and the pin 47 within the tubular member 42 in the aircraft wing will serve to lock the leading edge portions 19 in their neutral positions with respect to each of the aircraft wings 10 and 11. In this condition, each of the trailing edge portions 20 will be permitted to move independently of the other in an unrestrained fashion in response to aerodynamic pressured exerted by the wind gusts which act upon them.

To limit the extent of free travel of each of the trailing edge portions 20 under the influence of the aerodynamic pressures created by gusts, and to facilitate reengagement of the leading edge portion 19 and trailing edge portion 20 at any time regardless of the position of the respective trailing edge portions, each locking pin 47 is adapted to contact the flared end of the adjacent tubular member 46 when the particular trailing edge portion of each flap has pivoted to an extreme uppermost or lowermost position. To facilitate this, the flared leading edge of tubular member 46 is adapted to encounter the rounded end of the locking pin 47 when the pin is in its fully withdrawn position, thereby limiting the extent of unrestrained movement of the trailing edge portion 20 about the pivot pin 29 as best illustrated in FIG. 4.

The aforementioned threaded connecting rod 40 that forms part of the rod 37 will permit adjustment of the length of each rod 37 in order to position the end surface 44 within the tubular member 42. In this manner, the point of contact between the roller 51 on pin 47 and the rod 37 can be adjusted to determine the position and stroke or travel of the pin 47 within the tubular members 45 and 46. The extent to which the pin 47 is withdrawn from its engagement with the tubular member 46 in the trailing edge portion 20 will be dependent upon the length and position of the rod 37 as it is moved toward the left, as viewed in the drawings, and consequently the location of the point of contact between the flared end of the tubular member 46 and the end of the pin 47 will be determined by adjustment of the overall length of the rods 37. In this manner, the range or extent of unrestrained or floating movement of the trailing edge portion 20 in each particular flap installation can readily be adjusted according to the peculiarities that may be associated with each installation by altering the effective length of the rod 37 in the manner described.

The dotted line positions of FIG. 3 illustrate the maximum possible trailing edge portion free floating movement, while the full line position of the trailing edge portion as shown in FIG. 4 illustrates the free floating motion limiting feature afforded by the lock pin 47 and flared end tubular member 46. Moreover, the relative position and shape of the rounded end of the pin 47 within the flared portion of the tubular member 46 will serve to cam the tubular member and locking pin into engagement regardless of the position of the trailing edge portion 20 of the flap, when re-engagement of the leading edge and trailing edge flap portions are required, or when the gust alleviation mode is no longer necessary or desired.

Operation of the flap system 12 of the present invention as a lift generating device, i.e., with the leading edge portions 19 and the trailing portions 20 of the flaps connected by the locking device 32, is essentially the same as with any conventional trailing edge flap. That is to say, the flap may be extended, moved or pivoted downward from the wing by actuation of the rod 25 in the direction of the arrow in FIG. 1. This will increase the camber and in some cases the area depending upon the particular flap installation on the aircraft's lifting surfaces, thereby providing the wing with the capability to produce a higher lift coefficient than would otherwise be possible without the flap in a manner well known to those skilled in the art.

When the improved flap system of the present invention is to be utilized to alleviate the adverse effects of wing gusts, the trailing edge portion 20 of each flap is simultaneously disconnected from its respective leading edge portion 19 by actuation of the lever 33 to the dotted line position shown in FIG. 1, which corresponds to the full line position of FIG. 3. This will permit the pins 47 to be retracted from their respective tubular members 46 which are provided in each trailing edge portion 20 as the compression springs 49 urge each pin 47 toward the left to follow the cam surface 44 on the end of rod 37, which is also moved to the left by the lever 33 in the manner previously described. The trailing edge portions 20 will then be disconnected from the respective leading edge portions 19 and will be capable of unrestrained free floating movement about their respective pivot pins 29. In this condition, the trailing edge portions 20 act as both the gust sensor and the gust alleviator thus avoiding the complications of some of the earlier known systems for alleviating the effects of wind gusts. It must also be emphasized that for take-offs and landings the conventional aircraft high lift flap configuration is available by means of the flap system of this invention.

It has been unexpectedly determined that gust alleviation performance can be optimized without giving rise to flap flutter, controllability, or aircraft stability problems during varying flight attitudes, if the pivot pin 29 is located at a distance rearward from the leading edge of the trailing edge portion 20 which is approximately equal to 25 percent of the adjacent chord length of the trailing edge portion. When so located, tests have indicated that a 48 percent reduction in the static lift curve slope can be readily obtained while the flap system was found to be completely flutter free during operation within the flight envelope of particular aircraft that have been equipped with the floating flap trailing portion, in accordance with the present invention.

The flap system of the present invention has been described by way of example with particular application to a single slotted flap arrangement. However, the flap system of the present invention is readily applicable to other flap configurations including those types known generally as Fowler or multiple slotted flaps. Accordingly, while the invention has been described with reference to a certain preferred embodiment, it should be understood that variations and modifications may be made within the spirit and scope of the invention as defined in the appended claims.

What is claimed is:

1. An aircraft flap system for winged aircraft comprising flap means located near the trailing edge of each wing of said aircraft for increasing the effective lift of said wings, said flap means including means for alleviating the effects of wing gusts acting upon said aircraft and means operatively connected to said gust alleviating means for alternatively placing said gust alleviating means in a lift increasing mode when said flap means are used to increase the effective lift of said wings and in a gust alleviating mode when it is desired to eliminate or reduce the effects of wing gusts upon said aircraft.

2. The aircraft flap system of claim 1 wherein said gust alleviating means comprises at least one flap which is to at least a limited degree freely floating.

3. The aircraft flap system of claim 2 further comprising means associated with said freely floating flap for varying the amount of possible free floating movement of said freely floating flap.

4. The aircraft flap system of claim 1 further comprising means associated with said flap means for locking at least a portion of said flap means to the adjacent wing of said aircraft when said gust alleviating means is placed in the gust alleviating mode.

5. The aircraft flap system of claim 1 further comprising means associated with said gust alleviating means for locking said guist alleviating means to an adjacent portion of said flap means when said gust alleviating means is in the lift increasing mode.

6. The aircraft flap system of claim 1 wherein said flap means includes a trailing edge portion and said gust alleviating means comprises a trailing edge portion pivotally connected to said leading edge portion.

7. The aircraft flap system of claim 6 wherein said mode placing means includes means for locking said trailing edge portion to said leading edge portion to prevent relative pivotal movement between said trailing edge portion and said leading edge portion when said trailing edge portion is in the lift increasing mode.

8. The aircraft flap system of claim 6 wherein said mode placing means includes means for locking said leading edge portion of said flap means to an adjacent portion of a wing of said aircraft when said trailing edge portion is in the gust alleviating mode.

9. The aircraft flap system of claim 8 wherein said trailing edge portion is freely floating within limits when placed in the gust alleviating mode.

10. The aircraft flap system of claim 9 further comprising means for varying the limits in which said trailing edge portion is freely floating.

* * * * *